United States Patent
Stohr

(10) Patent No.: US 12,212,147 B2
(45) Date of Patent: Jan. 28, 2025

(54) HARVEST TRANSDUCER

(71) Applicant: Luis Stohr, Redondo Beach, CA (US)

(72) Inventor: Luis Stohr, Redondo Beach, CA (US)

( * ) Notice: Subject to any disclaimer, the term of this patent is extended or adjusted under 35 U.S.C. 154(b) by 204 days.

(21) Appl. No.: 17/752,111

(22) Filed: May 24, 2022

(65) Prior Publication Data
US 2023/0387718 A1 Nov. 30, 2023

(51) Int. Cl.
*H02K 35/02* (2006.01)
*H02J 7/00* (2006.01)
*H02J 50/00* (2016.01)
*H02K 1/34* (2006.01)
*H02N 2/18* (2006.01)

(52) U.S. Cl.
CPC .......... *H02J 50/001* (2020.01); *H02J 7/0025* (2020.01); *H02K 1/34* (2013.01); *H02K 35/02* (2013.01); *H02N 2/181* (2013.01); *H02N 2/186* (2013.01)

(58) Field of Classification Search
CPC .......... H02K 1/34; H02K 35/02; H02N 2/181; H02N 1/86; H02J 50/00

USPC ................ 310/12.16, 12.21, 12.04
See application file for complete search history.

(56) References Cited

U.S. PATENT DOCUMENTS

2023/0171529 A1* 6/2023 Teply .............. H02J 50/10
381/74

FOREIGN PATENT DOCUMENTS

CN 101145422 A * 3/2008 .......... H01F 41/0253
CN 102378089 A * 3/2012

* cited by examiner

*Primary Examiner* — Jose A Gonzalez Quinones
(74) *Attorney, Agent, or Firm* — Ying-Ting Chen; Law Office of Michael Chen

(57) ABSTRACT

A harvest transducer includes a moving cylinder; a coil system having a first coil and a second coil, the first coil and the second coil being surrounding the moving cylinder, the coil system further having magnetic means for generating a magnetic field and arranged on the moving cylinder; a rechargeable battery electrically connected with the second coil to store energy generated from the coil system; wherein the first coil and the second coil are connected in series.

14 Claims, 17 Drawing Sheets

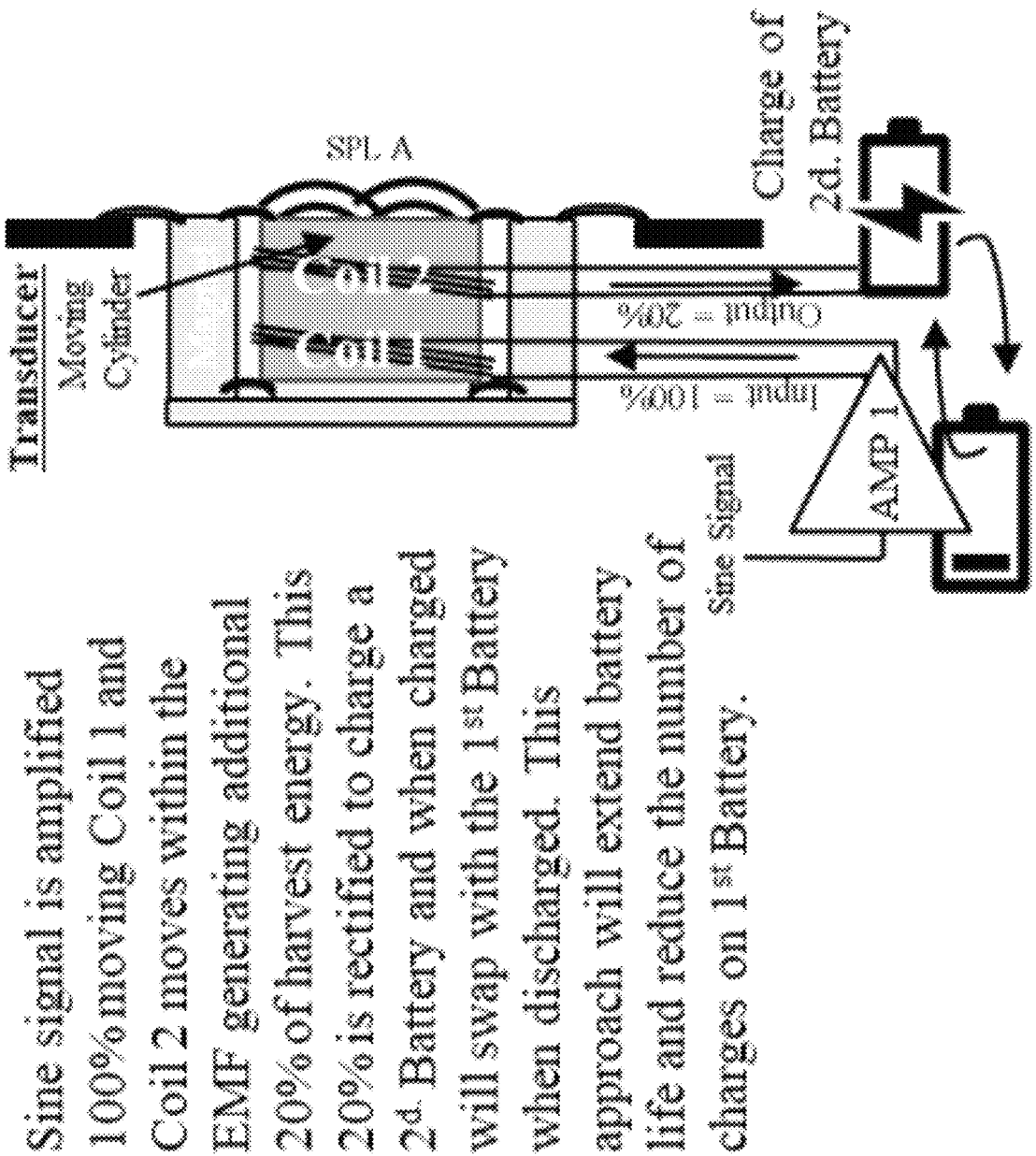
Figure 1: Harvest Energy Transducer Charging Battery.
Sine signal is amplified 100% moving Coil 1 and Coil 2 moves within the EMF generating additional 20% of harvest energy. This 20% is rectified to charge a 2d. Battery and when charged will swap with the 1st Battery when discharged. This approach will extend battery life and reduce the number of charges on 1st Battery.

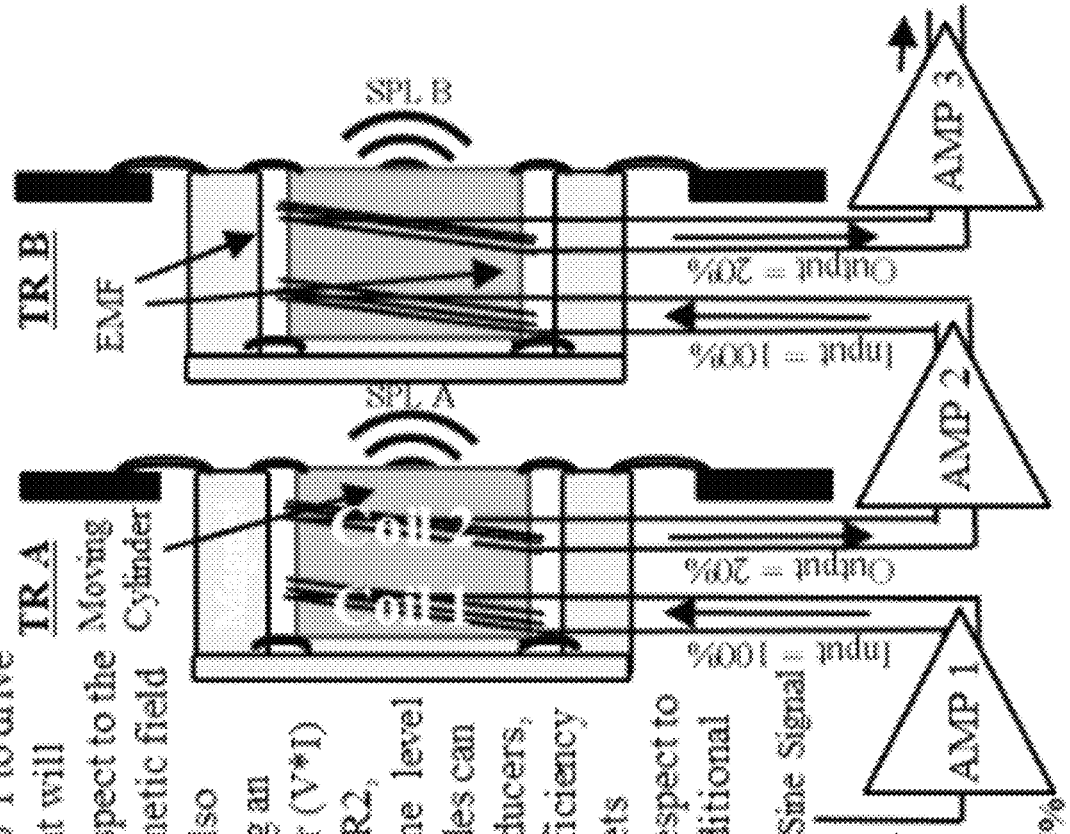

Figure 2: Harvest Energy Transducer Cascade.

Sine signal applied to Amp 1 to drive Coil 1 of Transducer A that will move the cylinder with respect to the magnet by the electromagnetic field (EMF) force. Coil 2 will also move thru EMF generating an additional 20% gain power (V*I) that amplified ~80% for TR2, Coil 1 of TR B has the same level (SPL B) as SPL A. Cascades can be used with various transducers, each with approx. 20% efficiency on each. Suspended magnets (shakes) also move with respect to the cylinder generating additional energy.
AMP 1 gain = 100%
AMP 2 Gain = +80% AMP 1 Gain
AMP 3 Gain = +80% AMP 2 Gain
AMP 3 Gain = 64% AMP 1 Gain
SPL A level = SPL B level
Total efficiency of idea vs. parallel configuration = +36%

Description

The PAM8403 is a 3W, class-D audio amplifier. It offers low THD+N, allowing it to achieve high-quality sound reproduction. The new filterless architecture allows the device to drive the speaker directly, requiring no low-pass output filters, thus saving system cost and PCB area.

With the same numbers of external components, the efficiency of the PAM8403 is much better than that of Class-AB cousins. It can extend the battery life, which makes it well-suited for portable applications.

The PAM8403 is available in SOP-16 package.

Features

- 3W Output at 10% THD with a 4Ω Load and 5V Power Supply
- Filterless, Low Quiescent Current and Low EMI
- Low THD+N
- Superior Low Noise
- Efficiency up to 90%
- Short Circuit Protection
- Thermal Shutdown
- Few External Components to Save the Space and Cost
- Pb-Free Package

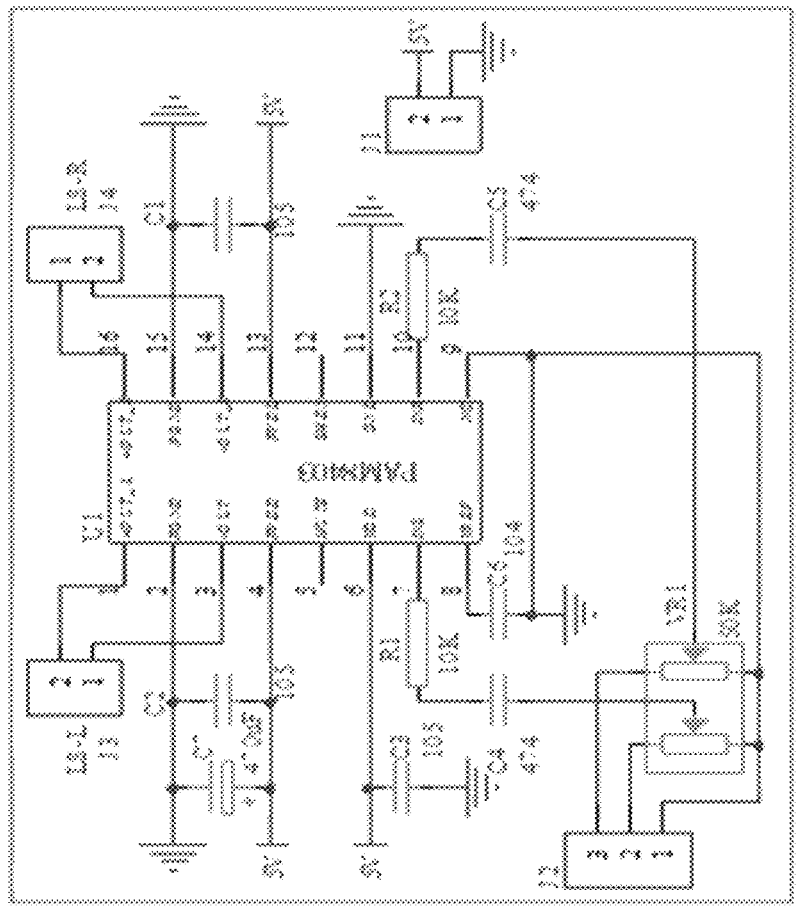

Fig. 4A

HARVEST TRANSDUCER

FIELD OF THE DISCLOSURE

The present disclosure relates to a transducer, and more particularly, a transducer having more than one coil, wherein the additional coil is used to stabilize the coil movement within one direction while the transducer is exposed to high power signals with high energy consumption. By adding an additional coil on a transducer cylinder to harvest energy for storing or using for the device functionality, it may increase system consumption efficiency and battery's lifespan.

BACKGROUND OF THE DISCLOSURE

Generally, a "Standard Headphone Setup" may be shown in FIG. 3. The double transducer setup, including a common single-coil in each transducer, may be currently used on the headset. Two transducers or transducers (e.g., for bone conduction) represent the left headset and right headset. According to the standard headphone setup, the electrical signal carrying an amplitude representing the source is applied to a moving coil exposed to a magnetic field. The coil creates an electromagnetic field when the electrical signal goes through the coil, and the attached cylinder moves based, at least in part, on the interaction of the N-S magnetic field (generally created by a magnet) and the opposing force of the electromagnetic field may be created by the coil. This opposing force moves the cylinder and, subsequently, the cone.

To improve the efficiency of the standard headphone setup, a simple solution is to provide a double-coil cylinder transducer with calculated results of harvest energy between 20% and 25%. The second coil of the double-coil cylinder transducer is used to stabilize the coil movement within one direction, The double-coil cylinder transducer implements a new approach for harvesting energy savings on the system. In addition, more than one transducer may be provided to offer a more efficient system having lower energy consumption.

All referenced patents, applications, and literatures are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a harvest transducer comprises a moving cylinder; a coil system having a first coil and a second coil, the first coil and the second coil being surrounding the moving cylinder, the coil system further having magnetic means for generating a magnetic field and arranged on the moving cylinder; a rechargeable battery electrically connected with the second coil to store energy generated from the coil system; wherein the first coil and the second coil are connected in series.

In another aspect combinable with the general implementation, the harvest transducer may further comprise an amplifier connected with the coil system.

In another aspect combinable with the general implementation, the harvest transducer may further comprise an input signal transmitted to the amplifier and the coil system, wherein the electrical signal is converted to a moving force to activate a movement of the moving cylinder.

In another aspect combinable with the general implementation, the harvest transducer may further comprise magnetic means comprising a first magnet arranged on one side of the moving cylinder and a second magnet arranged on an opposite side of the moving cylinder, wherein the one side of the moving cylinder is opposite of the opposite side of the moving cylinder.

In another aspect combinable with the general implementation, the harvest transducer may further comprise an input signal transmitted to the amplifier and a first coil to be transformed into an input electric energy, wherein the input electric energy is sent to the second coil to form an output electric energy which is stored in the rechargeable battery.

In another aspect combinable with the general implementation, the output electric energy is 20% of the input electric energy.

In another aspect combinable with the general implementation, the harvest transducer may include ribbon transducers, electrostatic transducers, electroacoustic transducers, public-address transducers, vehicle/home transducers, sound transducers, bone-conduction transducers, and vibration transducers.

Another aspect of the embodiment is directed to a harvest transducer system, comprising: two or more harvest transducers, each of the harvest transducers being connected in series; each of the harvest transducers comprising: a moving cylinder; a coil system having a first coil and a second coil, the first coil and the second coil being surrounding the moving cylinder, the coil system further having magnetic means for generating an electromagnetic field and arranged on the moving cylinder; wherein the first coil and the second coil are connected in series.

Among the many possible implementations of the harvest transducer system, the harvest transducer system may comprise at least one amplifier connected with the coil system.

Further, it is contemplated that the harvest transducer system may comprise an input signal transmitted to the amplifier and the coil system, wherein the input signal is converted to a moving force to activate a movement of the moving cylinder.

In the alternative, the harvest transducer system may comprise two or more transducers having a first transducer and a second transducer connected with the first transducer in a series.

It is still further contemplated that the amplifier comprises a first amplifier connected to the first coil of the first transducer and a second amplifier connected to the first coil of the second transducer.

In one embodiment, the magnetic means comprises a first magnet arranged on one side of the moving cylinder and a second magnet arranged on an opposite side of the moving cylinder, wherein the one side of the moving cylinder is opposite of the opposite side of the moving cylinder.

In another aspect combinable with the general implementation, the harvest transducer may comprise an input signal transmitted to the amplifier and a first coil to be transformed into an input electric energy, wherein the input electric energy is sent to the second coil to form an output electric energy which is stored in the rechargeable battery.

In another aspect combinable with the general implementation, the output electric energy is 20% of the input electric energy.

In another aspect combinable with the general implementation, the harvest transducer includes ribbon transducers, electrostatic transducers, electroacoustic transducers, public-address transducers, vehicle/home transducers, sound transducers, bone-conduction transducers, and vibration transducers.

In another aspect combinable with the general implementation, two or more transducers comprises a first transducer, an end transducer connected with the first transducer in series, and a plurality of middle transducers arranged between the first transducer and the end transducer.

In another aspect combinable with the general implementation, the harvest transducer may further comprise a rechargeable battery electrically connected with the end transducer to store energy generated from the coil system.

While this specification contains many specific implementation details, these should not be construed as limitations on the scope of any inventions or of what may be claimed but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

FIG. 1 is a diagram of a single harvest transducer according to an aspect of the embodiment.

FIG. 2 is a diagram of a harvest transducer system having more than one harvest transducer connected with each other in series according to an aspect of the embodiment.

FIG. 4A and FIG. 4B are amplifier circuit diagrams and specifications for the test setup of the experimentation according to an aspect of the embodiment.

DETAILED DESCRIPTION OF THE EMBODIMENTS

Figure 3:
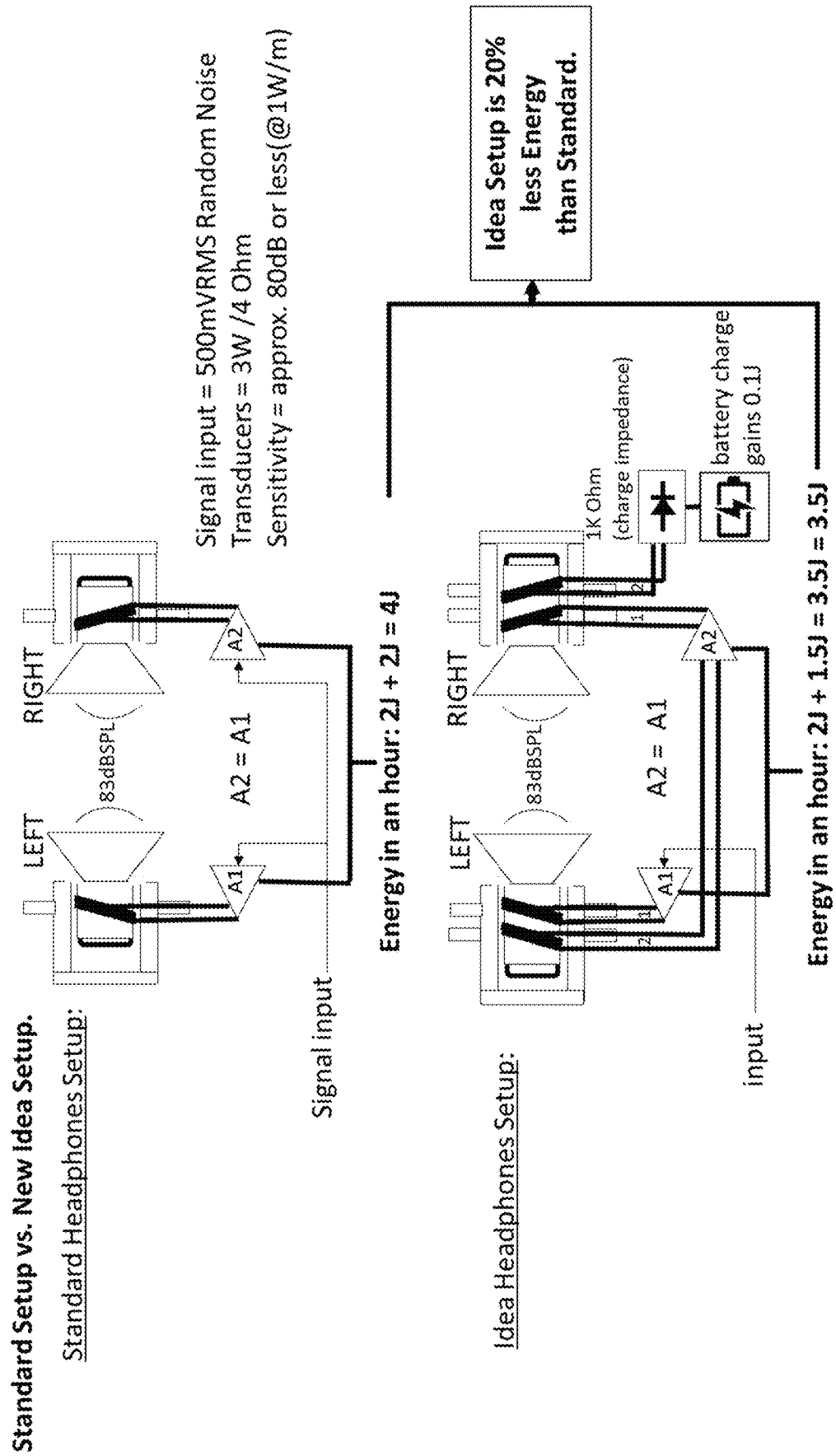
FIG. 3 is a diagram of a standard headphone setup compared with an ideal headphone setup (the harvest transducer system) according to an aspect of the embodiment.

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

As used herein, "harvest transducer," "transducer," and "device" are merely one form of harvest application. It will be apparent to one of ordinary skill in the art that the "transducer" or "earpiece" may be replaced by other words of the same kind, such as "player," "hearing aid," etc. Indeed, various implementations of the invention may be readily applied to other non-transducer-type hearing devices. It should be understood that the above-described "harvest transducer," "transducer," and "device" are exemplary, and any other "harvest transducer," "transducer," and "device" can be adopted in various embodiments of this disclosure.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

FIG. 1 generally depicts a single harvest transducer according to an aspect of the embodiment.

Referring to FIG. 1 of the drawings, the harvest transducer 10 may comprise a moving cylinder 11 and a coil system 20, having a first coil 21 and a second coil 22. In one embodiment, the first coil 21 and the second coil 22 may surround the moving cylinder 11 side by side, wherein the first coil 21 and the second coil 22 may be electrically connected in series.

In another embodiment, the coil system 20 may further comprise magnetic means 23 for generating an electromagnetic field, wherein the magnetic means 23 may be arranged on the moving cylinder 11. For example, magnetic means 23 may comprise a first magnet 231 arranged on one side of the moving cylinder 11 and a second magnet 232 arranged on an opposite side of the moving cylinder 11, wherein the one side of the moving cylinder 11 is opposite of the opposite side of the moving cylinder 11. For another example, the first coil 21 and the second coil 22 may be sandwiched between the first magnet 231 and the second magnet 232. It should be noted that, in one embodiment, the first coil 21 and the second coil 22 may be exposed under the electromagnetic field generated by the first magnet 231 and the second magnet 232.

In still another embodiment, an electrical signal carrying an amplitude representing the source may be applied to a first coil 21 exposed under the electromagnetic field. The first coil 21 may generate the electromagnetic field in such a manner. In contrast, the electrical signal goes through the first coil 21, and the moving cylinder 11 may move based, at least in part, on the interaction of the N-S magnetic field (generally created by the first magnet 231 and the second magnet 232). In this manner, the opposing force of the electromagnetic field may be created by the first coil 231. This opposing force (the opposition of the electromagnetic field) may cause a movement of the moving cylinder 11.

It should be noted that, in one embodiment, the second coil 22 may not supply a signal; however, the second coil 22 may harvest energy that is stored or used for the transducer's functionality. This approach may increase consumption efficiency and the lifespan of the battery.

As shown in further detail in FIG. 1, the harvest transducer 10 may comprise a rechargeable battery 12 electrically connected with the second coil 22 to store energy generated from the coil system 20. In one embodiment, the rechargeable battery 12 may further a first rechargeable battery 121 electrically connected to the first coil 21 and a second rechargeable battery 122 electrically connected to the second coil 22, wherein the first rechargeable battery 121 may be electrically connected to the second rechargeable battery 122.

Similarly, in the embodiment of FIG. 1, the second coil 22 may move within the magnetic field (the same as the first coil 21), and then the induction force generates between the magnetic means (the first magnet 231 and the second magnet 232), wherein the second coil 22 may generate energy in the form of an electric signal on the ends of the second coil 22. This energy generated from the second coil 22 may be stored and reused to harvest the transducer's energy consumption to improve system efficiency.

Accordingly, the transformation from electrical energy through electromagnetic and kinetic energies provides a result of a transformation of the electrical energy to power a second transducer and charge batteries.

The present harvest transducer also takes advantage of the kinetic energy released by the second coil 22 located around the moving cylinder 11 of the speaker (transducer) 10. The second coil 22 may be exposed to an induction field. During audio low frequencies reproduction (1 Hz to 300 Hz), the movement of the moving cylinder 11 generated by the first coil 21 may create kinetic energy transformed into electric energy through the second coil 22. This electricity generated by the second coil 22 may be stored in the rechargeable battery or may drive a second transducer in situations where a two-transducer system is required, such as left and right transducers, as shown in FIG. 2.

Accordingly, in one embodiment, the double coil transducer may improve energy efficiency by generating electricity that could be used or stored. Additionally, during movements of the transducer 10 while being wearing (a headset) or being carried by an object (ex., Mounted on a vehicle), the second coil 22 of the transducer 10 may generate electric energy that can be captured or reutilized depending on how large of the electromagnetic field generated by the speaker or transducer magnet. The present invention can be implemented in cascade, using several double coil transducers connected in series.

The harvest transducer 10 of FIG. 1 also optionally includes an amplifier 13 connected with the coil system 20. For one example, the amplifier 13 may be a lower power amplifier. In one embodiment, the amplifier 13 may be required to drive each transducer 10. The rechargeable battery 12 may be reduced to discharge to extend its usage time. In another embodiment, the transducers 10 may be used as vibrators or magnets suspended by springs (bone conduction, massage, etc.). According to the initial test results, an additional 20% of the energy may be generated by the transducer 10 described in the embodiment of the present invention.

In another embodiment, continuing to FIG. 1, an input signal (sine signal) 14 may be transmitted to the amplifier 13 and the first coil 21, wherein the input signal 14 may be transformed into an input electric energy, wherein the input electric energy may be sent to the second coil 22 to form an output electric energy which is stored in the rechargeable battery 12.

As shown in further detail in FIG. 1, in one embodiment, the output electric energy is 20% of the input electric energy, wherein the output electric energy may be rectified to charge the second rechargeable battery 122 with the first rechargeable battery 121 being discharged. In other words, the lifespan of the first rechargeable battery 121 may be extended due to the reduction of charging of the first rechargeable battery 121.

FIG. 2 generally depicts a harvest transducer system 100 having more than one harvest transducer connected with each other in series according to an aspect of the embodiment.

Referring to FIG. 2, the harvest transducer system 100 may comprise two or more harvest transducers, including a first harvest transducer 10A and a second harvest transducer 10B, wherein the first harvest transducer 10A may be connected in series with the second harvest transducer 10B.

In one embodiment, each of the harvest transducers may comprise a moving cylinder 11A and a coil system 20A, having a first coil 21A and a second coil 22A, wherein the first coil 21A and the second coil 22A may surround the moving cylinder 11A. In one embodiment, the coil system 20A may further comprise magnetic means 23A for generating an electromagnetic field and arranged on the moving cylinder 11A. It should be noted that, in one embodiment, the first coil 21A and the second coil 22A may be connected in series.

In still one embodiment, the harvest transducer system 100 may further comprise at least one amplifier 13A connected with the coil system 20A, wherein the amplifier 13A comprises a first amplifier 131A connected to the first coil 21A of the first transducer 10A, a second amplifier 132A connected between the first coil 21B of the second transducer 10B and the second coil 22A of the first transducer 10A, and a third amplifier 133A connected to the second coil 22B of the second transducer 10B.

In still another embodiment, continuing to FIG. 2, the input signal may be transmitted to the first amplifier 131A and the first coil 21A of the first transducer 10A, wherein the input signal may be transformed into the input electric energy, wherein the input electric energy may be transmitted to the second coil 22A of the first transducer 10A to form a first output electric energy which is sent to the second transducer 10B.

In still another embodiment, the input signal may be an electrical signal transmitted to the amplifier 13A and the coil system 20A, 20B, wherein the electrical signal is converted to a moving force to activate a movement of the moving cylinder 11A, 11B.

The harvest transducers 10A, 10B may convert the input signal containing the sound information into kinetic energy. Conversion of energy may accompany the generation of power, and the harvest transducers 10A, 10B can use a specific transduction device to realize the conversion of a signal into voltage. The conversion process may involve the coexistence and conversion of multiple different types of energy. For example, in one embodiment, the electrical signal may be directly converted to mechanical movements by the moving cylinder inside the harvest transducer device. Other types of energy which is co-present and converted during the harvest transducer device's operation may include thermal energy, magnetic field energy, and the like. The energy conversion method of the energy conversion device may include but is not limited to moving coil type, electrostatic type, piezoelectric type, moving iron type, pneumatic type, electromagnetic type, etc. The frequency response range and the sound quality of harvest transducers may be affected by different transduction methods and the performance of various physical components in the transduction apparatus.

It is obvious to skilled individuals that, after understanding the basic principle of the transduction mode, the specific device can affect the sound effect quality of the harvest transducer. It is possible to appropriately take over, combine, modify or change the above-mentioned influencing factors without departing from the principle to obtain the desired sound quality. For example, a permanent magnet of high magnetic density with a more desirable material and design of the coil system and moving cylinder may be utilized in the harvest transducer to better sound quality.

The term "sound quality" as used herein is understood to reflect the quality of sound and refers to the fidelity of the audio after processing or transmission. Sound quality may be mainly described by three elements: loudness, tone, and timbre. Loudness is the subjective perception of the human ear of the intensity of the sound and is proportional to the logarithmic value of the intensity of the sound. For example, the greater intensity of the sound may be perceived as louder. Tone, also known as pitch, refers to the subjective perception of the human ear of the frequency of sound vibration. The pitch depends mainly on the sound's fundamental frequency (the higher the fundamental frequency, the higher the pitch). It may be related to the intensity of the sound. Timbre refers to the subjective perception of sound characteristics by the human ear. The timbre mainly depends on the spectral structure of the sound and may also be related to factors such as the loudness, duration, building, and decay processes of the sound. The spectral structure of sound may be described by fundamental frequency, the number of harmonics, distribution of harmonics, the magnitude of amplitude, and phase relationship. Different spectral structures have different timbres. Even if the fundamental frequency and loudness are the same, the timbre is different if the harmonic structure is different.

The contemplated coil can be made of suitable materials, such as but not limited to stainless steel, aluminum, beryllium, tantalum, copper, iron, magnesium, titanium, plastic-metal alloy, polycarbonate-metal alloy, and all reasonable combinations thereof. In addition, the thickness of the coil may be defined by the power calculation of the design.

In still another embodiment, the amplifier may be, for example, a microphone to pick up sounds from the user/wearer's surroundings and, under certain algorithms, the amplifier may transmit the sound processed (or resulting electrical signal) to the harvest transducer. In addition, the harvest transducer may be modified to incorporate a function of picking up ambient sound. After a certain signal processing, the harvest transducer may transmit the sound to the user/wearer, thereby implementing the function of the harvest hearing aid. In such a way, the algorithms described herein may include one or more combinations of noise cancellation, automatic gain control, acoustic feedback suppression, wide dynamic range compression, active environment recognition, active anti-noise, directional processing, tinnitus processing, multi-channel wide dynamic range compression, active howling suppression, volume control, etc.

It should be noted that the (first) output electric energy generated by the harvest transducer may improve the device's efficiency. The methods and steps described herein may be implemented in any suitable order, or simultaneously where appropriate. In addition, individual steps may be deleted from any of the methods without departing from the spirit and scope of the subject matter described herein. Any of the examples described above may be combined with aspects of any of the other examples described to form further examples without losing the desired effect.

In some alternative aspects of the electrical signal, the electrical signal may comprise sound information, including video, audio files having a particular data format, or data or files that can carry data enable to be converted to sound through a particular means. In one embodiment, the sound information may come from the harvest transducer's memory unit or an information generation, storage, or transmission system other than the harvest transducer.

Alternatively, the input signals may be acoustic signals, wherein the acoustic signals may include signals other than electrical signals, such as optical signals, magnetic signals, mechanical signals, and the like. In principle, the input signal can be processed as a sound signal, as long as it contains sound information that the transducer can use to generate vibrations. The sound signal is not limited to one signal source and may be a plurality of signal sources. These multiple signal sources may or may not be related to each other. The sound signal transmission or generation mode can be wiredly connected or wirelessly connected and can be real-time or delayed. For example, the harvest transducer may receive the electrical signal containing sound information in a wired connection or wireless connection or may directly obtain data from a storage medium providing the sound signal. It should be noted that, in one embodiment, the harvest hearing aid can be added with a component with a sound collecting function, and, in such a way, the mechanical vibration of sound may be converted into the electrical signal by picking up sound in the environment, and then the electrical signal which meets specific requirements may be obtained after the electrical signal is processed by the amplifier.

In still one embodiment, the wired connection may include, but is not limited to, the use of metal cables, optical cables, or a hybrid of metal and optical cables, such as coaxial cables, communication cables, flexible cables, spiral cables, non-metallic sheathed cables, multi-core cables, twisted pair cables, ribbon cables, shielded cables, telecommunication cables, twin cables, parallel twin wires, and twisted pairs. The above-described examples are merely for the convenience of illustration, and the medium for wired connection may be other types of transmission medium, such as other transmission mediums for electrical or optical signals. Wireless connections may include but are not limited to radio communications, free-space optical communications, acoustic communications, electromagnetic induction, and the like. It should be noted that the radio communication may include, but is not limited to, IEEE802.11 series of standards, IEEE802.15 series of standards (e.g., Bluetooth and ZigBee technologies, etc.), first generation mobile communication technologies, second generation mobile communication technologies (e.g., FDMA, TDMA, SDMA, CDMA, and SSMA, etc.), general packet radio service technologies, third generation mobile communication technologies (e.g., CDMA2000, WCDMA, TD-SCDMA, and WiMAX, etc.), fourth generation mobile communication technologies (e.g., TD-LTE and FDD-LTE, etc.), satellite communication (e.g., GPS technologies, etc.), Near Field Communication (NFC), and other technologies operating in ISM band (e.g., 2.4 GHz, etc.). Free space optical communications may include but are not limited to visible light, infrared signals, and the like. Acoustic communications may include but are not limited to acoustic waves, ultrasonic signals, and the like. Electromagnetic induction may include but is not limited to near-field communication techniques and the like. The above examples are for the convenience of illustration only, and the medium for the wireless connection may be other types, such as Z-wave technology, other premium civilian radio bands, military radio bands, etc. For example, in some application scenarios of the present technology, the harvest transducer may obtain a signal containing sound information from another device through Bluetooth technology, or directly obtain data from a memory unit of the harvest transducer, and then generate a sound signal.

With specific reference to FIG. 2, each of the harvest transducers of the harvest transducer system 100 may comprise magnetic means 23A, having the first magnet 231A arranged on one side of the moving cylinder 11A and the second magnet 232A arranged on an opposite side of the moving cylinder 11A, wherein the one side of the moving cylinder 11A is opposite of the opposite side of the moving cylinder 11A.

In still another embodiment, the harvest transducer system 100 may also feature to capture parts of the kinetic energy from the harvest transducer generating sound from the input signal (the electrical signal) and reuse this kinetic energy to contribute to the energy required to generate sound for a second transducer. Two harvest transducers may always be necessary on a headset.

In another embodiment, the second transducer 10B may also have the same approach as the first transducer 10A. The current system of how the sound transducer converts electric energy into kinetic energy to create sound waves is efficient and straightforward. In a way, the kinetic energy may move the cylinder coils, cone, and damper, representing a mechanical resistance loss. The harvest transducer system 100 may recuperate some of the energy lost by the mechanical resistance of the transducer components and take advantage of the kinetics to transform it back into the electric energy throughout the magnetic field.

FIG. 3 generally depicts a standard headphone setup compared with an idea headphone setup (the harvest transducer system) according to an aspect of the embodiment.

Referring to FIG. 3 a "Standard Headphone Setup" is arranged for testing. This is a common single-coil, double transducer setup currently used on the headset. Two transducers or transducers (ex. for bone conduction), representing left and right on the headset, may produce a total of 83 dBSPL captured by a dummy head. Each transducer has a sensitivity of 80 dB @ 1 W/m. Two amplifiers A1 and A2 have adjusted gains to amplify the signal on the transducer's inputs to produce a total of 80 dB-SPL a 1.1 Watt RMS on each transducer, or a total of 83 dB-SPL. The amplifiers' power consumption may be measured by recording current on a 12V DC line that powers the amplifiers, giving 0.8 Watts RMS on one amplifier or a total of 1.6 Watts RMS on the two amplifiers.

Figure 4B:
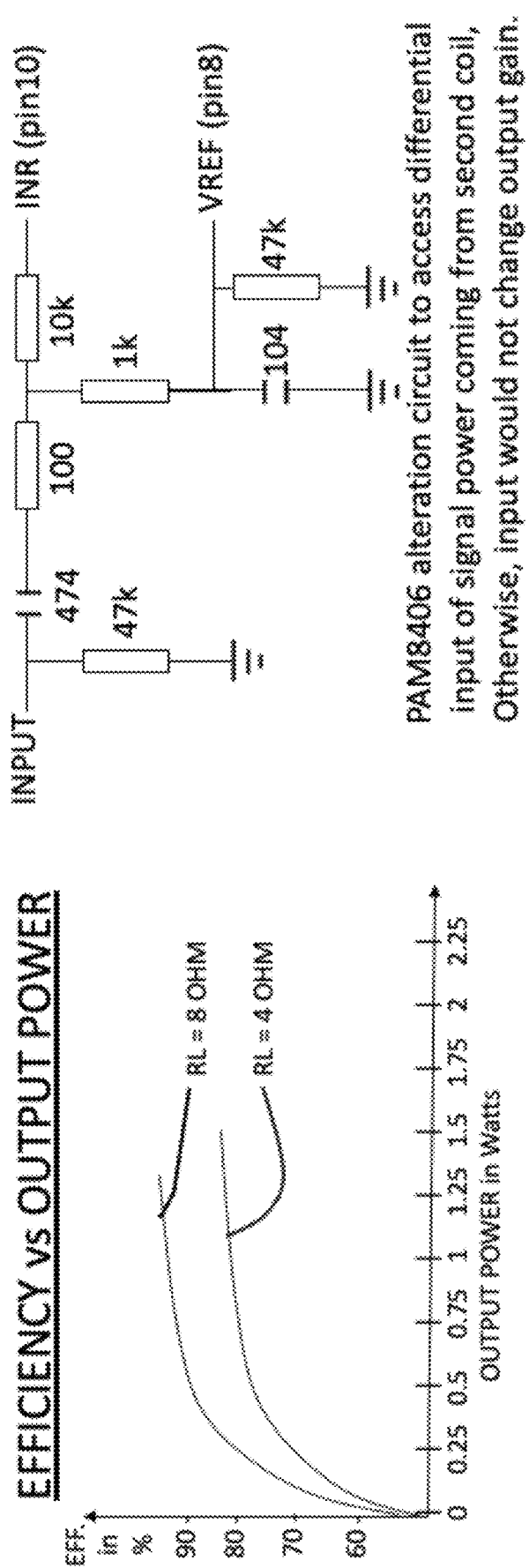

FIG. 4A and FIG. 4B generally depict amplifier circuit diagrams and specifications for the test setup of the experimentation according to an aspect of the embodiment.

Referring to FIG. 4A and FIG. 4B, the PAM8403 may be a small digital amplifier chip, with the advantages of digital amplifier board low noise, and the sound output of 1 W RMS on 4 Ohm may be a good range for the experiment as amplifier "A." In one embodiment, the input may be controlled by a potentiometer, and the power is DC 5V.

Turning now to FIGS. 3 to 4B, the standard headphone setup and the idea headphone setup (the harvest transducer system) may be arranged for testing. The idea headphone setup (the harvest transducer system) may utilize a double-coil system, with a double transducer setup, including a left transducer and a right transducer, on the headset. In one embodiment, each transducer may comprise a sensitivity of 80 dB @ 1 W/m. After connecting the second coil of the left transducer to the second amplifier "A2", the sound of the left transducer decreases, and "A1" gain may be increased to generate 80 dB-SPL, from 0.8 Watts RMS to 1.0 Watts RMS. Now, the A2 amplifier with the source signal from the second coil of the left transducer may need a small amount of gain to achieve the right transducer to be 80 dB-SPL (combined with the left transducer is 83 dB), and in this way, "A2" consumption may be 0.3 Watts RMS which is required for the left transducer. Also, the signal output of the second coil of the right transducer may be connected to a 1K Ohm load representing the rectification circuit for a battery charge. A power consumption of 0.1 Watts RMS may be generated. This 0.1 Watts RMS may be considered energy gain that can be reutilized to charge the headset's batteries. Comparing the power consumption of the standard headphone setup (1.6 Watts RMS) with the idea headphone setup (1.4 Watts RMS), as shown in FIG. 2, the idea headphone setup may require 0.2 Watts RMS less than the standard headphone set, and there is an additional 0.2 Watts RMS for battery charge available. In other words, the idea headphone setup may consume 0.4 Watts RMS less than the standard headphone setup.

Figure 5B:
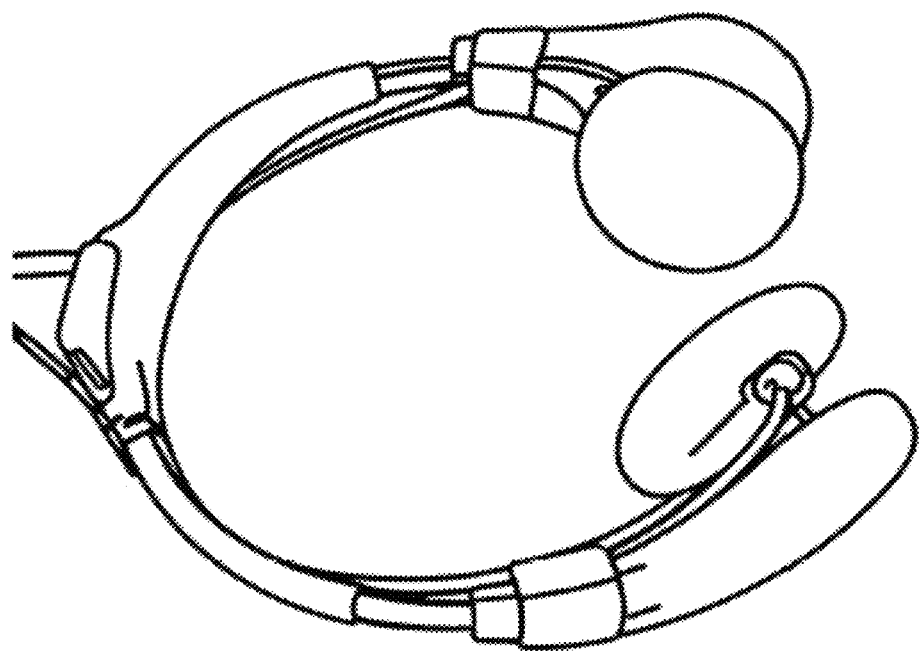
FIG. 5A and FIG. 5B are the headsets built by a ring mounting holding two left and right double-coils, four pairs of wires transducers or transducers, and with foams according to an aspect of the embodiment.
Figure 5A:
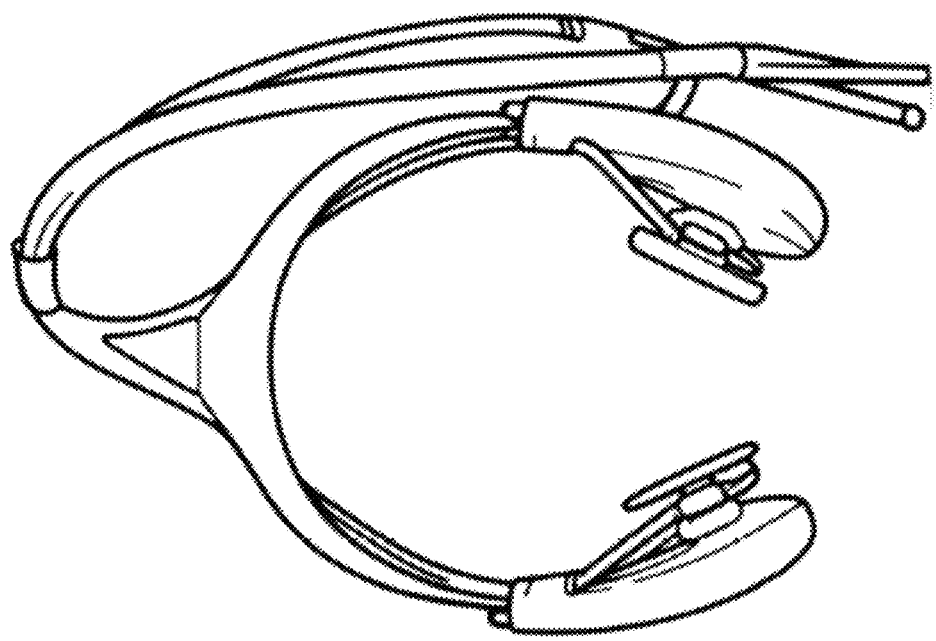

In one embodiment, the headset may be custom built by a ring mounting holding two left and right double-coil, four pairs of wires transducers or transducers (ex. for bone conduction) as shown in FIG. 5A and with foams for isolatly contacting, as shown in FIG. 5B. Left and Right transducers produce a total of 83 dB SPL, captured by a dummy head.

FIG. 6 to FIG. 8B generally depict more than two harvest transducers connected in series according to an aspect of the embodiment.

Figure 6:
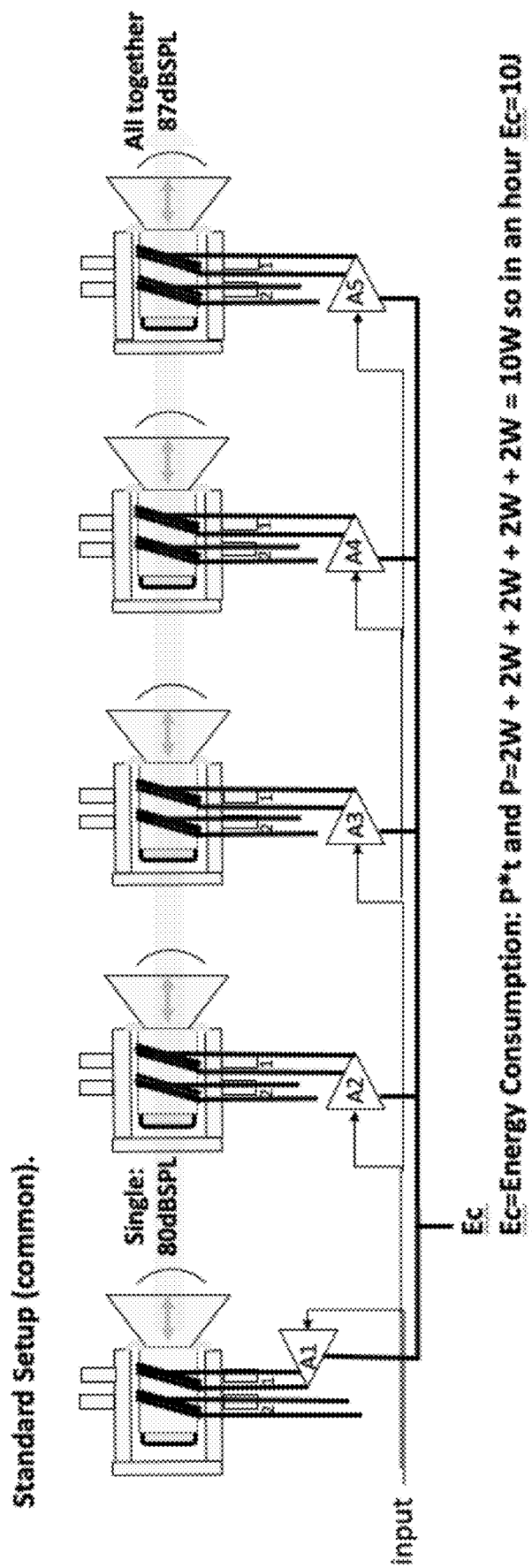
FIG. 6 is a diagram of a standard setup having five amplifier-transducer inputs connected in parallel according to an aspect of the embodiment.
Figure 7:
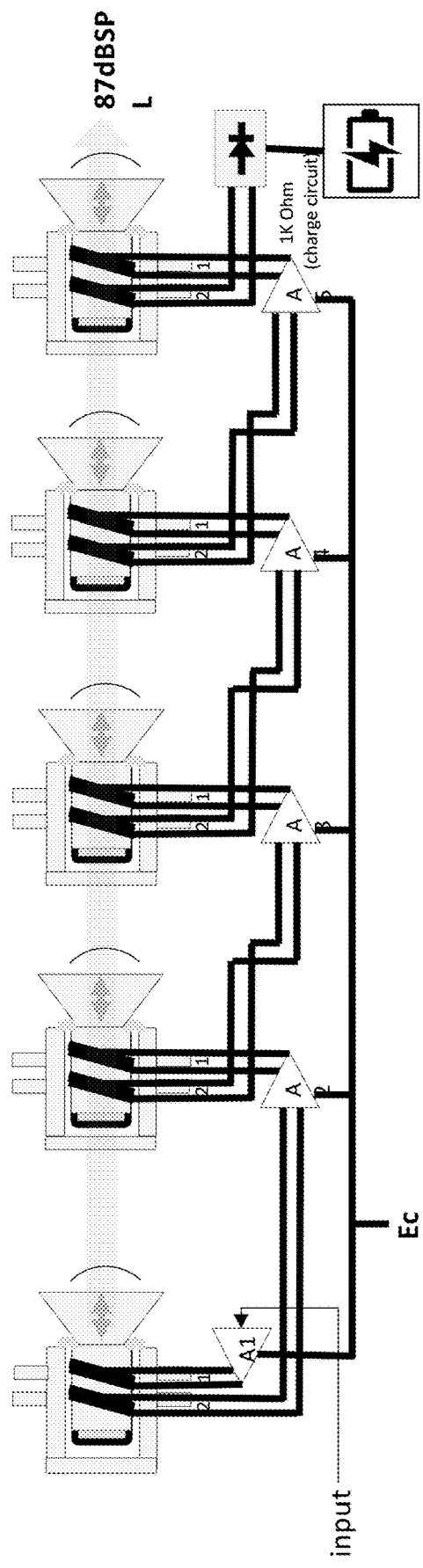
FIG. 7 is a diagram of an idea new setup having five amplifier-transducer inputs connected in series according to an aspect of the embodiment.

Referring to FIG. 6-7, the sound pressure levels may be expressed in decibels (dB S.P.L.), a logarithmic scale. Therefore, the sound pressure dB values cannot be simplified to be arithmetically added levels (e.g., 45 dB plus 45 dB does not equal 90 dB). To simply adding two or more sound levels, the difference between the highest and next highest sound level is 0-1 dB, and then adding 3 dB to the higher level to give the total sound level, for 2-3 dB, and then adding 2 dB to the higher level to provide the total sound level for 4-9 dB, and then adding 1 dB to the higher level to give the total sound level for 10 dB. The total sound level is equal to the higher level. For example, adding two sounds of 45 dB and 45 dB (in-phase) is equal to 38 dB based on that the difference therebetween is 0 dB. While two (2) transducers are used to generate a total of 83 dB, each transducer output may be listed as follows:

| Transducer (#) | output (dB S.P.L.) |
|---|---|
| 1 | 80 |
| 2 | 80 |

Having the output value of each transducer and knowing the efficiency of each amplifier with a 5 VDC power supply, it is possible to calculate the expected current consumed at the inputs of each amplifier connected to each transducer. Calculating each power consumption may be expected during the experimentation. The amplifier used herein is the PAM8403, which can generate a low THD+N output of 0.1% under 1 Watt @ 5 VDC, and with 80% of efficiency or less, and also the nominal impedance of the speaker is 4 Ohm. The estimation is that the amplifier efficiency is 80%.

Normally, the speaker sensitivity estimation is 78 dB, requiring 50% more power for SPL of 1 W @ 1 m, $$P=1\ W*1.5=1.5\ W$$

Based on manufacturer specifications, this specific speaker sensitivity is approximately 80 dB S.P.L. (@ 1 watt noise input, measured at 1 m axial distance between speaker and measuring microphone). The transducer power consumption coil measures 80 dB S.P.L. between the acquired transducers. Because of the inefficiency of the amplifier, the amplifier efficiency may be estimated at 70% instead of 80%.

$$P=1.5\ W*1.3=2\ W\ (2\ \text{Watts is defined as energy over time}).$$

$$Ec=P*t=2\ W*1\ \sec=2\ J\ (J=\text{Joules}).$$

Therefore, the consumption of the system (amplifier and speaker) producing 80 dB SPL in an hour is calculated as 2 J (J=Joules).

$$I=P/V=2\ W/5\ VDC=400\ mA$$

For two systems, the power is double, $$Ps=400\ mA+400\ mA=800\ mA$$

Now, based on the new idea of the stereo system, the second coil of the first transducer (speaker) may supply 10% additional power to the second transducer (speaker), so the electrical signal does not need to be amplified as the electrical signal of the first transducer speaker. This means that the consumption of the second amplifier is 80% of the consumption of the first amplifier, which is calculated to be as follows, $$P=1.5\ W*0.8*1.3=1.5\ W$$

$$Ec=P*t=1.5\ W*1\ \sec=1.5\ J$$

So, the consumption of one system (amplifier and speaker) is to produce 80 dB SPL in an hour, which may be calculated as 2 J (J=Joules).

$$I=P/V=1.5\ W/5\ VDC=300\ mA$$

For two systems, the power is 400 mA for the first amplifier and 300 mA for the second amplifier, $$Ps=400\ mA+300\ mA=700\ mA$$

Based on the calculations, the five amplifier-transducer inputs connected in parallel, as shown in FIG. 6, should be closed to the inputs.

Accordingly, the calculations show that 0.5 J or 25% of the harvest energy Ec1 is that the standard 2 J minus the new idea 1.5 J.

Referring to FIG. 7, the idea new idea setup may provide a total of 87 dB, which may be measured @1 m distance,

| Transducer (#) | output (dB S.P.L.) |
|---|---|
| 1 | 80 |
| 2 | 80 |
| 3 | 80 |
| 4 | 80 |
| 5 | 80 |

As seen in the first experiment analyzing the systems as black boxes with inputs, outputs, and supplies, the comparison between the standard setup and the new idea setup is shown in FIG. 7.

On the standard setup, all inputs are connected to the noise generator, and the total system consumption is calculated as follows, $$P=V*(I1+I2+I3+I4+I5)=5 \text{ VDC } (400 \text{ mA}+400 \text{ mA}+400 \text{ mA}+400 \text{ mA}+400 \text{ mA})=10 \text{ W}$$

Which in an hour may be, $$Ec=Pc*t=10 \text{ W}*1 \text{ sec}=10 \text{ J}$$

On the new idea setup, only the first input of the noise generator is connected to the first system and consumes 400 mA, and the rest consume 300 mA plus the remaining gives energy for an additional battery charge circuit represented by a 1 KOhm resistor.

$$P=V*(I1+I2+I3+I4+I5)=5 \text{ VDC}(400 \text{ mA}+300 \text{ mA}+300 \text{ mA}+300 \text{ mA}+300 \text{ mA})=8 \text{ W}$$

Which in an hour would be, $$Ec=Pc*t=8 \text{ W}*1 \text{ sec}=8 \text{ J}$$

The calculations show that a 2 J or 20% harvest energy Ec2 is that the standard 10J minus the new idea 8 J.

Figure 8B:
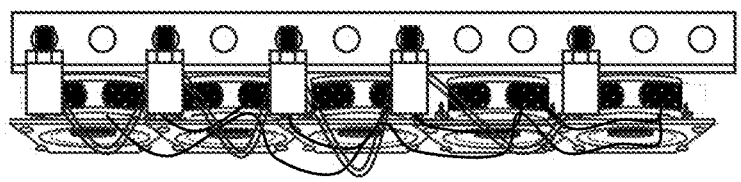
FIG. 8A and FIG. 8B show the complete circuit setup of FIG. 6 and FIG. 7, respectively.
Figure 8A:
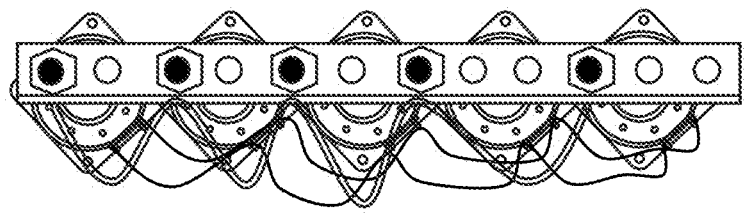

Continuing to FIG. 6 and FIG. 7, the A1 is amplifying to move the transducer cone through the first coil to produce sound. The second coil of the first transducer may be the source of the second amplifier A2, wherein the electrical signal inputted into the second transducer may be larger than the A1 input, so less A2 gain is required compared with A1. This setup is duplicated up to amplifier A5 with the fifth (end) transducer. The second coil is connected to a resistor that simulates the average impedance of a charging load of the battery charger circuit and the rectification circuit. The complete circuit setup is shown in FIG. 8A and FIG. 8B.

In still another embodiment, PNG-ONE, a Pink Noise generator from Audio Source, may be used as the initial signal source for amplifier A1, with a signal level adjusted with the potentiometer equal to 83 dB SPL on the transducer audio output, inside the chamber. Subsequently, the amplifier A2 and the rest of the amplifiers, including amplifiers A3, A4, and A5, are adjusted using the same procedure. Each amplifier consumption current is recorded, and the total consumption plus the consumption on the resistor simulating the impedance of the battery charger may be recorded and compared to the original parallel configuration commonly used to reproduce sound.

Continuing to FIG. 6 and FIG. 7, the harvest transducer system 100 may further comprise two or more transducers comprising the first transducer 10A, an end transducer 10E connected with the first transducer 10A in series, and a plurality of middle transducers, including the second transducer 10B, arranged between the first transducer 10A and the end transducer 10E. In one embodiment, the plurality of middle transducers may further comprise the second transducer 10B, a third transducer 10C, and a fourth transducer 10D, wherein the second, third, and fourth transducer 10B, 10C, 10D may be connected with the first transducer 10A and the end transducer 10E in series.

The harvest transducer system 100 of FIG. 6 and FIG. 7 may further comprise a rechargeable battery 12A electrically connected with the end transducer 10E to store energy generated from the coil system.

In another embodiment, the harvest transducer may include ribbon transducers, electrostatic transducers, electret transducers, electroacoustic transducers, public-address transducers, vehicle/home transducers, sound transducers, bone-conduction transducers, or vibration transducers. It should be understood that the above-described transducers are exemplary and any other transducers can be adopted in various embodiments of this disclosure.

In some alternative aspects of the harvest transducer system, the harvest transducer system may further comprise a storage device/storage unit, wherein the storage device/storage unit may include a Direct Attached Storage (Direct Attached Storage), a Network Attached Storage (Network Attached Storage), and a Storage area Network (Storage area Network). The storage device includes, but is not limited to, various common storage devices such as solid-state storage devices (solid-state disk, solid-state hybrid disk, etc.), mechanical hard disk, USB flash memory, memory stick, memory card (e.g., CF, SD, etc.), other drives (e.g., CD, DVD, HD DVD, Blu-ray, etc.), Random Access Memory (RAM), and Read-Only Memory (ROM). The RAM may include, but is not limited to decimal count tubes, delay line memories, Williams tubes, Dynamic Random Access Memories (DRAMs), Static Random Access Memories (SRAMs), thyristor random access memories (T-RAMs), zero-capacitance random access memories (Z-RAMs), and the like. The ROM, in turn, may have but is not limited to: bubble memory, magnetic button wire memory, thin-film memory, magnetic plated wire memory, magnetic core memory, magnetic drum memory, optical disk drive, hard disk, magnetic tape, early NVRAM (nonvolatile memory), phase change memory, magneto resistive random access memory, ferroelectric random access memory, nonvolatile SRAM, flash memory, EEPROM, erasable programmable read-only memory, shielded read-stack memory, floating gate random access memory, nano-RAM, racetrack memory, variable resistive memory, and programmable metallization cells, etc. It should be understood that the above-described storage device/storage unit is exemplary and any other storage device/storage unit can be adopted in various embodiments of this disclosure.

In some embodiments, the above description of the structure of the vibration generating part of the harvest transducer is merely a specific example. It should not be considered the only possible embodiment. It will be apparent to those skilled in the art that, having the benefit of the above descriptions, numerous modifications and variations can be made in the specific constructions and arrangements of parts that will carry out this vibration without departing from the general teaching, but these modifications and variations are within the scope of the invention as defined in the foregoing description.

In another embodiment, the moving cylinder inside the harvest transducer may be made from a temperature resistant material (for example, but not limited to, high-molecular polyethylene, blow-molded nylon, engineering plastic, and the like), rubber, or other single or composite materials capable of achieving the same performance. The rubber may be, for example, but not limited to general-purpose types of rubber and special-purpose types of rubber.

In still another embodiment, general-purpose rubbers include but are not limited to natural rubber, isoprene rubber, styrene-butadiene rubber, neoprene rubber, and the like. Specialty-type rubbers have but are not limited to nitrile rubber, silicone rubber, fluor rubber, polysulfide rubber, urethane rubber, chlorohydrin rubber, acrylate rubber, propylene oxide rubber, and the like. The styrene-butadiene rubber includes, but is not limited to, emulsion-polymerized styrene-butadiene rubber and solution-polymerized styrene-butadiene rubber.

For composite materials, reinforcing materials may include but are not limited to glass fibers, carbon fibers, boron fibers, graphite fibers, graphene fibers, silicon carbide fibers, or aramid fibers. For another example, the reinforcing materials may be a composite of other organic and/or inorganic materials, such as glass fiber reinforced unsaturated polyester, epoxy resin, or phenolic resin matrix. Other materials may be used to form the vibration transmitting layer including one or a combination of silicone, polyurethane (Poly Urethane), and polycarbonate (PolyCarbonate). The vibration transmission layer's existence can affect the system's frequency response, change the tone quality of the harvest transducer, and simultaneously play a role in protecting elements in the shell.

In still another embodiment, the vibration transmission layer may change the vibration mode of the panel so that the frequency response of the whole system is smoother. The vibration mode of the panel is affected by factors such as the properties of the panel itself, the connection mode between the panel and the vibration plate, the connection mode between the panel and the vibration transmission layer, the vibration frequency, and the like. The panel's properties include but are not limited to the mass, size, shape, stiffness, vibration damping, etc. Preferably, a panel of the non-uniform thickness (e.g., without limitation, a panel having a center thickness greater than an edge thickness) may be used. The connection mode of the panel and the vibrating plate includes but is not limited to glue bonding, clamping or welding, and the like. The attachment of the panel and the vibration transfer layer include, but are not limited to, glue attachment. Different vibration frequencies can correspond to different vibration modes of the panel, including the integral translation and the torsion translation of various panel degrees. The tone quality of the harvest transducer can be changed by selecting the panel with the specific vibration mode in a specific frequency range. Preferably, the specific frequency range may be 20 Hz-20000 Hz. For example, the frequency range may be 20 Hz-1000 Hz. For another example, the frequency range may be 30 Hz-800 Hz. For still another example, the frequency range may be 60 Hz-500 Hz. Under normal conditions, the sound quality of a harvest transducer may be influenced by various factors, such as the physical properties of each component of the transducer, the vibration transmission relationship among the components, the vibration transmission relationship between the transducer and the outside, and the efficiency of a vibration transmission system in transmitting vibration. The components of the harvest transducer itself include components that generate vibrations (such as, but not limited to, a transducer device), components that secure the transducer (such as but not limited to, an earphone frame/earphone strap), and components that transmit vibrations (such as but not limited to, a faceplate, a vibration transmission layer, etc.).

Figure 9:
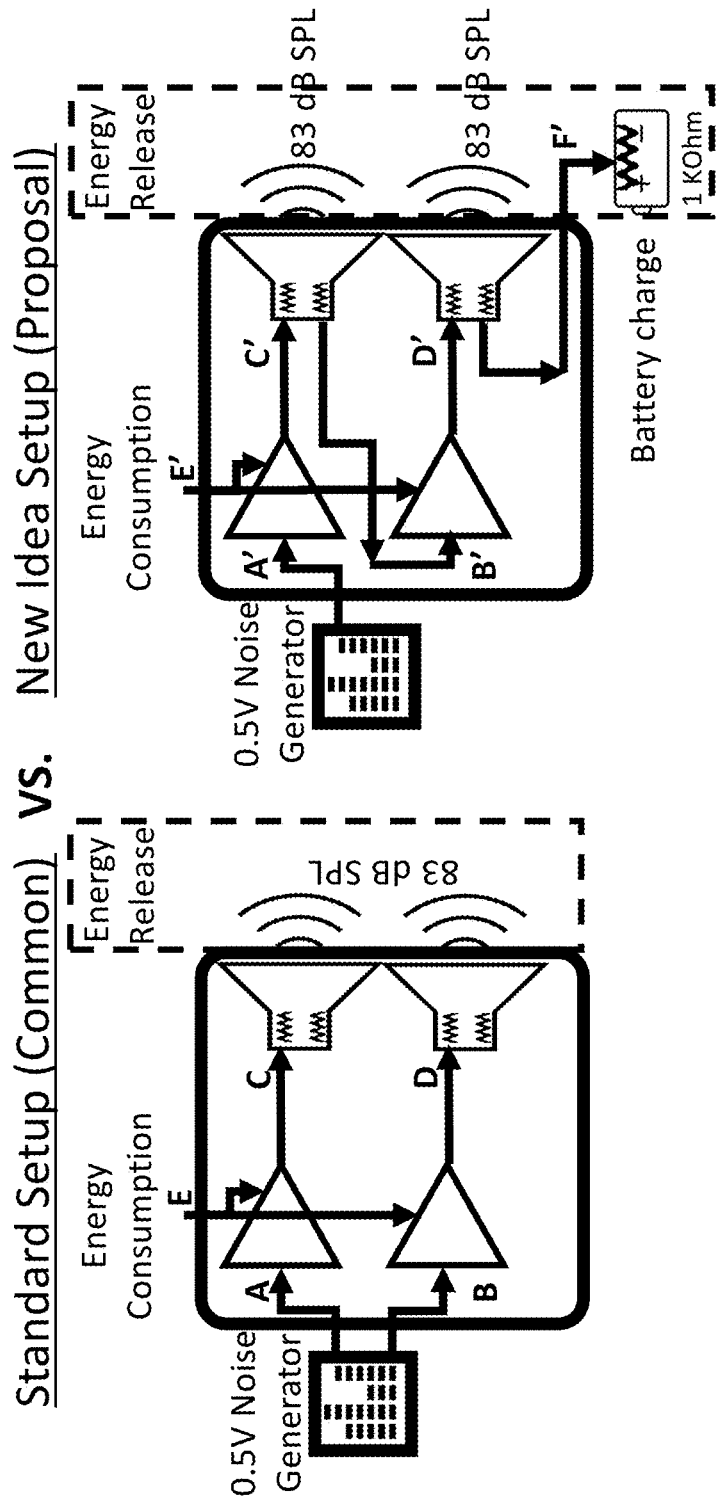
FIG. 9 shows the left transducer and the right transducer of the standard setup, comparing the left transducer and the right transducer of the new idea setup.
Figure 10:
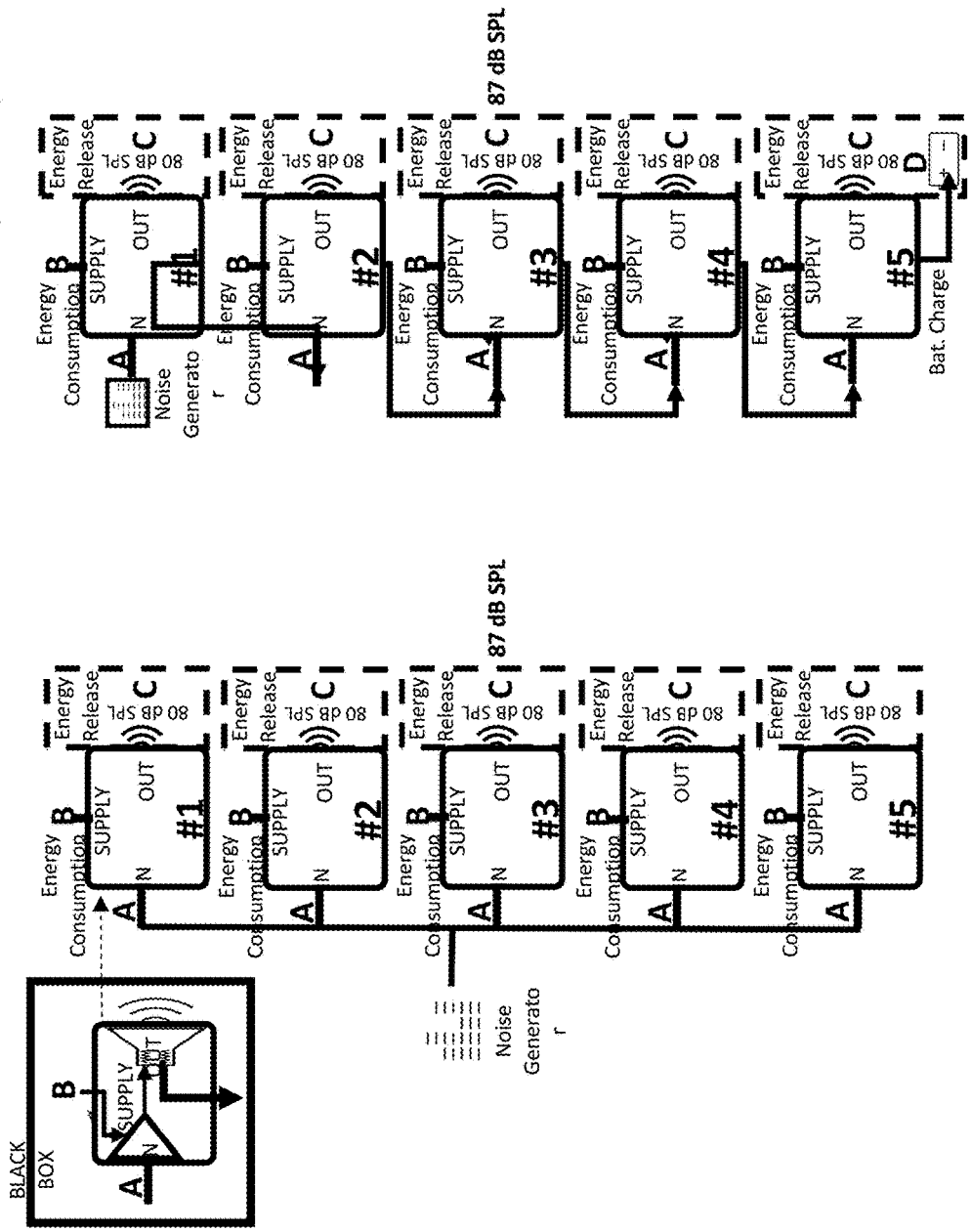
FIG. 10 shows the standard setup having more than two transducers connected in the parallel compared with the new idea setup having more than two transducers connected in series.

FIG. 9 and FIG. 10 generally depict the standard setup comparing the new idea setup according to an aspect of the embodiment. FIG. 9 shows the left transducer and the right transducer of the standard setup and the new idea setup. FIG. 10 shows more than two transducers connected in series for the standard setup and the new idea setup.

Referring to FIG. 9, to avoid external conditions that may alter results, the current measurements, considering energy within an hour are shown as follows,

|  | Amp Inputs | | SPK Coils Inputs | Consumption | | Outputs |
| --- | --- | --- | --- | --- | --- | --- |
| | | | Standard Setup | | | |
| Graph points | A | B | C | D | E | F | SPL |
| Values | 0.5 V | 0.5 V | 1 J | 1 J | 4 J | — | 83 dB |
| | | | New Idea Setup | | | |
| Graph points | A' | B' | C' | D' | E' | F' | SPL |
| Values | 0.5 V | 0.6 V | 1 J | 1 J | 3.5 J | 0.1 J | 83 dB |

Harvest Energy 4 J−3.5 J=0.5 J

Since the Standard Setup has total harvest energy of 0.5 J, the calculation of Ec1 may also be 0.5 J. A 25% of harvest energy saving may be proven, and the idea configuration experimentation result is confirmed.

Referring to FIG. 10, to avoid external conditions that may alter results, the current measurements, considering energy within an hour are shown as follows,

| | Inputs | Supplies | Outputs |
| --- | --- | --- | --- |
| Graph points | A | B | C |
| Standard Setup for 5 Systems | | | |
| #1 | 0.5 V | 400 mA | 80 dB |
| #2 | 0.5 V | 400 mA | 80 dB |
| #3 | 0.5 V | 400 mA | 80 dB |

| Graph points | Inputs A | Supplies B | Outputs C |
|---|---|---|---|
| #4 | 0.5 V | 400 mA | 80 dB |
| #5 | 0.5 V | 400 mA | 80 dB |
| | Total | 2 A | |
| => Ec = 5 V * 2 * t = 10 J | | | |
| New Idea Setup for 5 Systems | | | |
| #1 | 0.5 V | 400 mA | 80 dB |
| #2 | 0.6 V | 300 mA | 80 dB |
| #3 | 0.6 V | 300 mA | 80 dB |
| #4 | 0.6 V | 300 mA | 80 dB |
| #5 | 0.6 V | 300 mA | 80 dB |
| | Total | 1.6 A | |
| => Ec = 5 V * 1.6 * t = 8 J | | | |

Harvest Energy 10 J−8 J=2 J

Since the Standard Setup has the total harvest energy is 2 J, the calculation of Ec2 may be 2 J. There are no differences between calculation and experimentation, so the results are accurate. A 20% harvest energy saving is proven, and the idea configuration experimentation result is confirmed.

Figure 11:
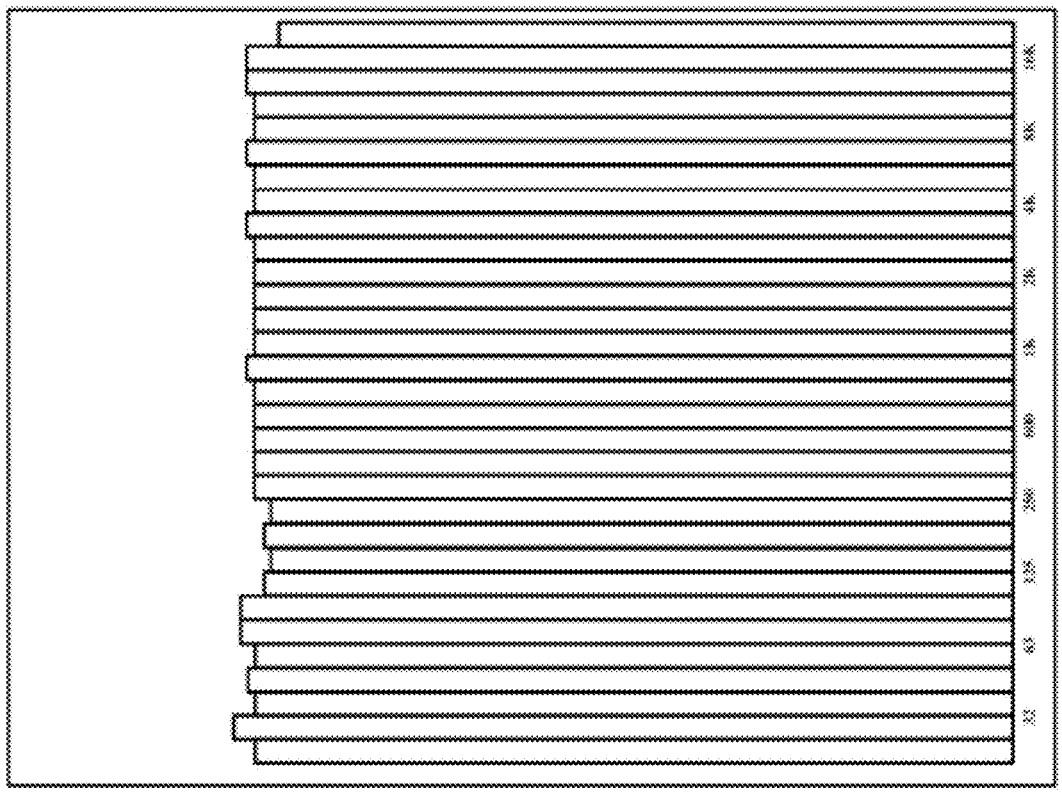
FIG. 11 shows a source signal noise according to an aspect of the embodiment.
Figure 12:
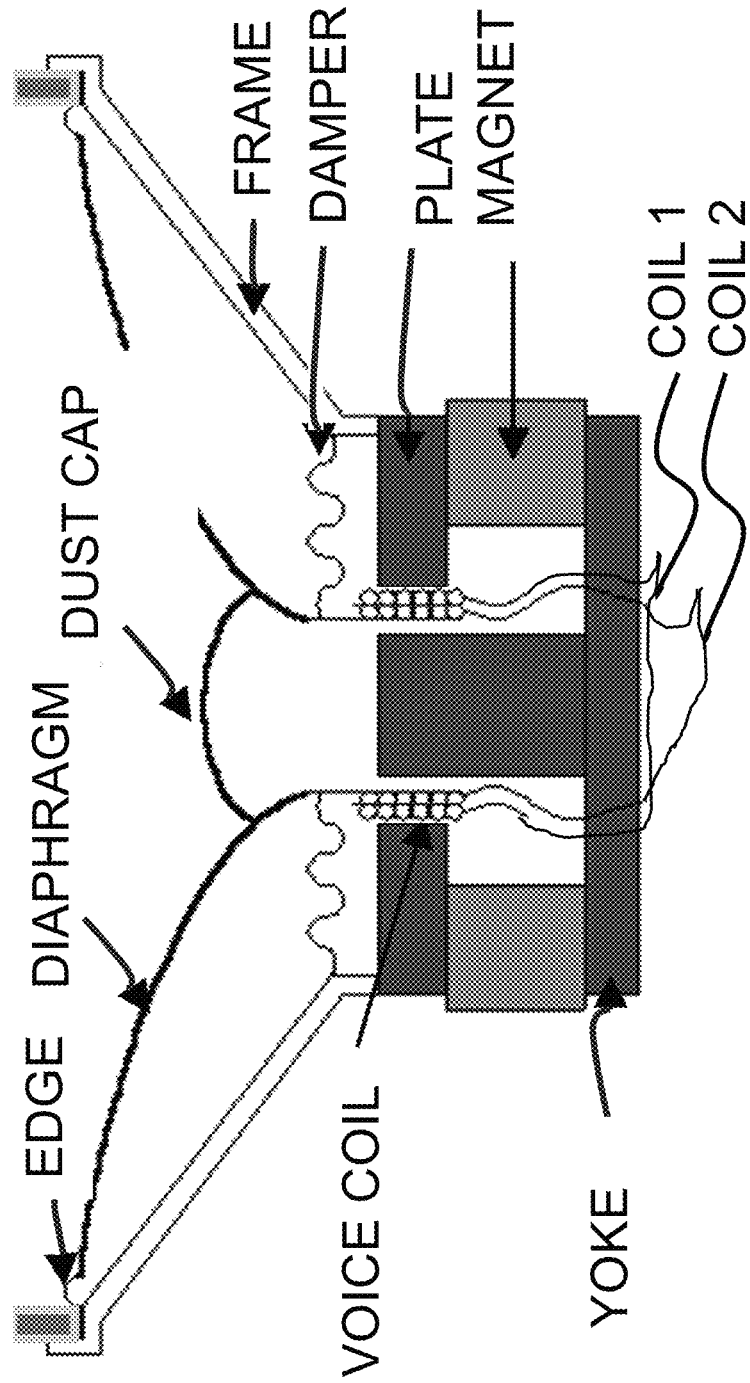
FIG. 12 is a diagram of a low-power transducer (headset) using a double coil according to an aspect of the embodiment.
Figure 13:
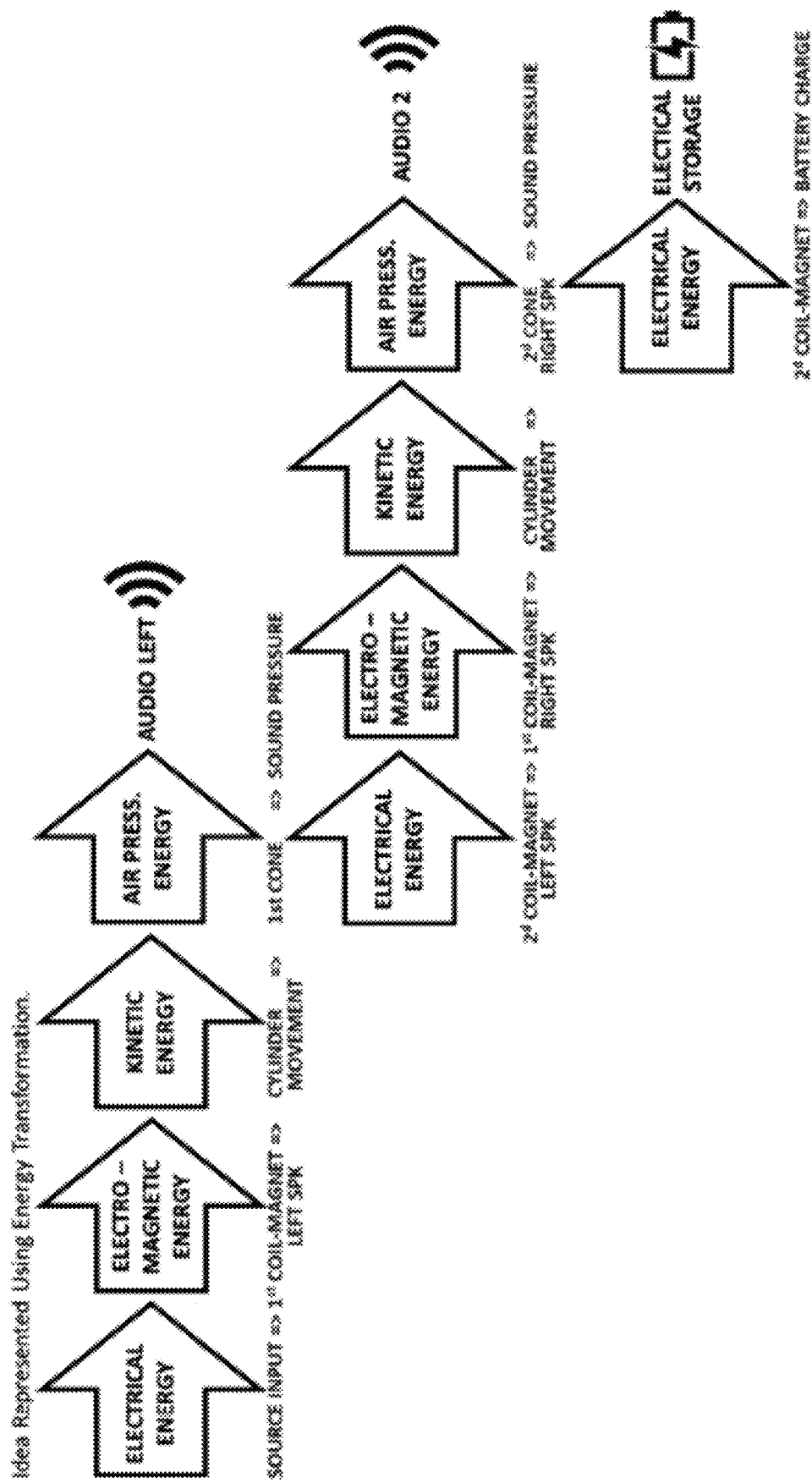
FIG. 13 is a diagram representing the energy transformation executed by the idea setup according to an aspect of the embodiment.
Figure 14:
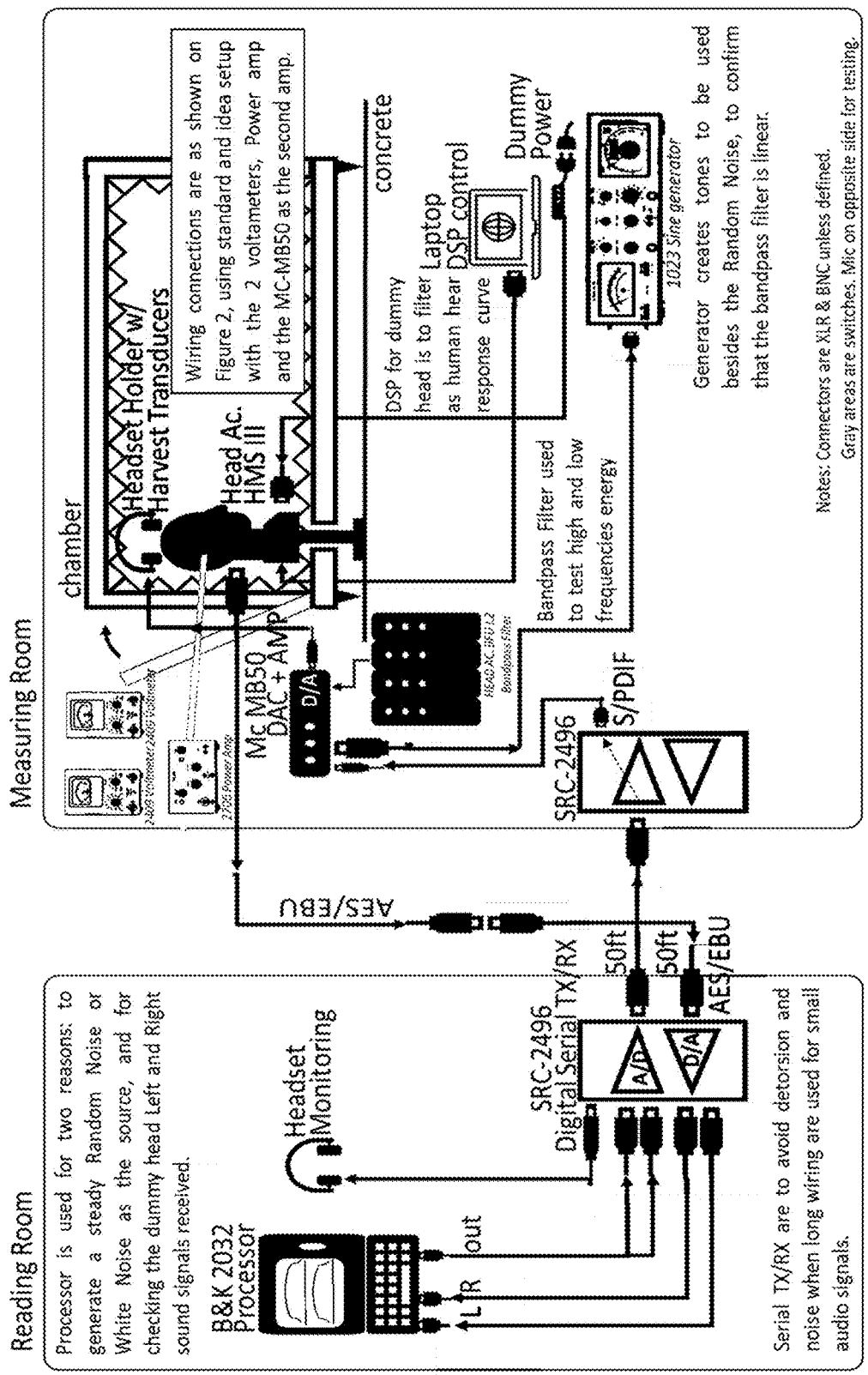
FIG. 14 is a diagram showing a laboratory setup and equipment connections utilized in experimentations according to an aspect of the embodiment.
Figure 15B:
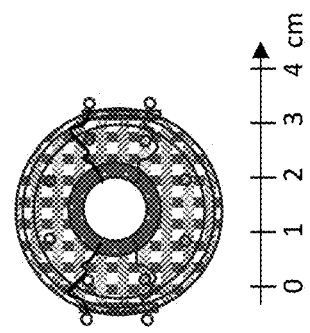
FIG. 15A to FIG. 15F show the transducer manufactured for the experimentation according to an aspect of the embodiment.
Figure 15D:
Figure 15A:
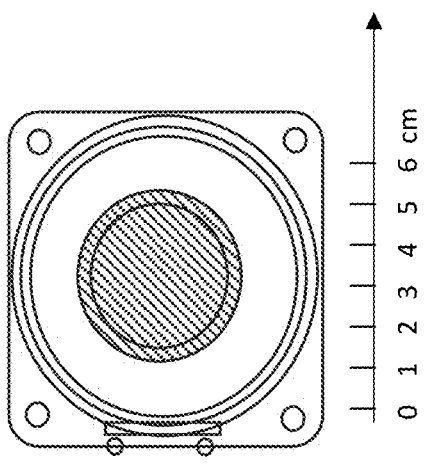
Figure 15C:
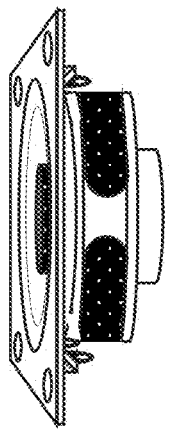
Figure 15F:
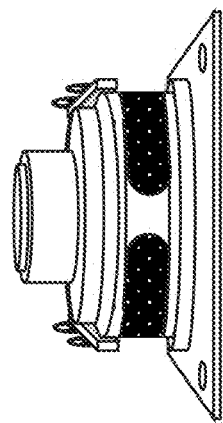
Figure 15E:
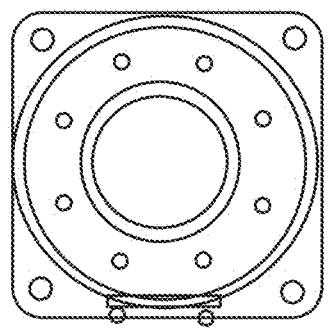

FIG. 11 generally depicts source signal noise according to an aspect of the embodiment.

Referring to FIG. 11, the source signal noise may be confirmed to be 20 Hz to 20 KHz @ 90 dB+/−3 dB.

An amount of 25 custom-made transducers may be tested with source signal noise. A total of seven transducers may be selected in which the output is approximately the same, wherein the output may be around 88 dB SPL (one watt @ 1 meter) in the anechoic chamber. These may be mounted as a series array with a bracket to maintain the same distance therebetween on the experimentation. Two of the selected custom-made transducers may be tested with source signal noise to confirm left and right levels output measurements using the dummy head and calibrating the dummy head output to be around 88 dB SPL (one watt @ 1 meter) in the anechoic chamber. These may be mounted as a headphone setup for experimentation from an amount of ten amplifiers circuits. Gain control may be tested, and seven amplifiers may be selected to perform the same gain and frequency response levels.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of harvest transducer have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalents within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted, and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material, or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims therefore include not only the combination of elements that are literally set forth but all equivalent structure, material, or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can, in some cases be excised from the combination and that the claimed combination may be directed to a subcombination or variation of a subcombination.

What is claimed is:

1. A harvest transducer, comprising: a moving cylinder;
   a coil system having a first coil and a second coil, the first coil and the second coil being surrounding the moving cylinder, the coil system further having magnetic means for generating a magnetic field, magnetic means being arranged on the moving cylinder;
   a rechargeable battery electrically connected with the second coil to store energy generated from the coil system; wherein
   the first coil and the second coil are connected in series and;
   wherein magnetic means comprises a first magnet arranged on one side of the moving cylinder and a second magnet arranged on an opposite side of the moving cylinder, wherein the one side of the moving cylinder is opposite of the opposite side of the moving cylinder; wherein
   in the series connection between the first coil and the second coil, an input signal is transmitted to an amplifier and the first coil, and to be transformed into an input electric energy, wherein the input electric energy is sent to the second coil to form an output electric energy stored in the rechargeable battery.

2. The harvest transducer of claim 1, wherein the amplifier is connected with the coil system.

3. The harvest transducer of claim 2, wherein the input signal is converted to a moving force to activate a movement of the moving cylinder.

4. The harvest transducer of claim 1, wherein the output electric energy is 20% of the input electric energy.

5. The harvest transducer of claim 1, wherein the harvest transducer includes ribbon transducers, electrostatic transducers, electret transducers, electroacoustic transducers, public-address transducers, vehicle/home transducers, sound transducers, bone-conduction transducers, and vibration transducers.

6. A harvest transducer system, comprising:
two or more harvest transducers, each of the harvest transducers being connected in series; each of the harvest transducers comprising:
a moving cylinder;
a coil system having a first coil and a second coil, the first coil and the second coil being surrounding the moving cylinder, the coil system further having magnetic means for generating an electromagnetic field, the magnetic means being arranged on the moving cylinder; wherein the first coil and the second coil are connected in series;
wherein magnetic means comprises a first magnet arranged on one side of the moving cylinder and a second magnet arranged on an opposite side of the moving cylinder, wherein the one side of the moving cylinder is opposite of the opposite side of the moving cylinder; wherein
in the series connection between the first coil and the second coil, an input signal is transmitted to an amplifier and the first coil, and to be transformed into an input electric energy, wherein the input electric energy is sent to the second coil to form an output electric energy.

7. The harvest transducer system of claim 6, wherein the amplifier is connected with the coil system.

8. The harvest transducer system of claim 7, wherein the input signal is converted to a moving force to activate a movement of the moving cylinder.

9. The harvest transducer system of claim 6, wherein two or more transducers comprise a first transducer and a second transducer connected with the first transducer in series.

10. The harvest transducer system of claim 9, wherein the amplifier comprises a first amplifier connected to the first coil of the first transducer and a second amplifier connected to the first coil of the second transducer.

11. The harvest transducer system of claim 6, wherein the output electric energy is 20% of the input electric energy.

12. The harvest transducer system of claim 6, wherein the harvest transducer includes ribbon transducers, electrostatic transducers, electret transducers, electroacoustic transducers, public-address transducers, vehicle/home transducers, sound transducers, bone-conduction transducers, and vibration transducers.

13. The harvest transducer system of claim 6, wherein two or more transducers comprise a first transducer, an end transducer connected with the first transducer in series, and a plurality of middle transducers arranged between the first transducer and the end transducer.

14. The harvest transducer system of claim 13, wherein the rechargeable battery is electrically connected with the end transducer to store the output electric energy generated from the coil system.

* * * * *